Patented Mar. 30, 1943

2,315,472

UNITED STATES PATENT OFFICE 2,315,472

MANUFACTURE OF BARIUM CARBONATE

Isaac Ephraim Weber, Luton, and William Stanley Wood, Harpenden, England

No Drawing. Application January 12, 1940, Serial No. 313,642. In Great Britain December 14, 1938

12 Claims. (Cl. 23—66)

One of the disadvantages associated with the manufacture of barium carbonate from barium sulphide solution and soda ash is the poor colour of the barium carbonate. This renders the barium carbonate unsuitable for incorporation with pigments and is an objection where the barium carbonate is used in the manufacture of glass, enamels, and luminous pigments. The poor quality of the barium carbonate is due substantially to the impurities present in the soda ash, they are of a metallic nature and although they may be present only as traces they form dark coloured insoluble sulphides which spoil the colour and purity of the barium carbonate produced.

In the improved manufacture constituting this invention the soda ash or sodium carbonate or sodium bicarbonate or mixtures of these whether in the solid, crystalline or dissolved form which is to be used in the manufacture, is purified by means of a sulphide. Thus, the soda ash may be dissolved in the sodium sulphide solution and the precipitated impurities are filtered. The solution of soda ash and sodium sulphide thus obtained is used to precipitate a barium carbonate from a barium sulphide solution. For this purpose the solution of sodium sulphide and sodium carbonate may be added to the barium sulphide solution, or vice versa, or simultaneously at a suitable temperature and a suitable concentration.

With reference to the two conditions last named it may be pointed out that the solubility of barium sulphide in water varies considerably with the temperature, as shown by the following table:

| Temperature | Percentage of BaS (by weight) |
|---|---|
| 20° C | 6.25 |
| 40° C | 10.5 |
| 60° C | 16.0 |
| 80° C | 21.0 |

The solubility of anhydrous sodium carbonate (soda ash) in sodium sulphide solution also varies appreciably with the temperature, as will be seen from the following figures, wherein the soda ash is dissolved in a sodium sulphide solution containing 0.1 lb. sodium sulphide per gallon and 0.2 lb. sodium sulphide per gallon, at 20, 40 and 60° C. respectively.

| Temperature | Lbs. Na$_2$S per gallon | Lbs. Na$_2$CO$_3$ per gallon |
|---|---|---|
| 20° C | 0.1 | 2.0 |
| 40° C | 0.1 | 4.2 |
| 60° C | 0.1 | 3.9 |
| 20° C | 0.2 | 1.8 |
| 40° C | 0.2 | 4.0 |
| 60° C | 0.2 | 3.8 |

Thus, to avoid the use of solutions which will crystallise during the precipitation, it is necessary to choose temperatures which vary according to the concentration.

The following examples illustrate the invention:

Example I

To 500 gallons of an aqueous solution of barium sulphide of 1.225 specific gravity at 70° C. and containing approximately 2½ lbs. of barium sulphide per gallon, was added a solution of sodium carbonate in sodium sulphide prepared as follows: To a sodium sulphide solution at 50° C. and containing 0.3 lb. of sodium sulphide per gallon, was added soda ash (anhydrous sodium carbonate) to give 3 lbs. of soda ash per gallon. The black precipitate was filtered and the filtrate added to the barium sulphide liquor at a temperature a little below 70° C. until a faint excess of sodium carbonate was present. Approximately 265 gallons of the sodium carbonate-sodium sulphide solution were required. The precipitated barium carbonate was filtered, washed free from sodium sulphide and dried.

Example II

To 500 gallons of an aqueous solution of barium sulphide of 1.225 specific gravity at 70° C. and containing approximately 2½ lbs. barium sulphide per gallon was added, whilst stirring, a solution of sodium carbonate in sodium sulphide prepared as follows: To a sodium sulphide solution at 60° C. and containing 0.9 lb. of sodium sulphide per gallon, and obtained from a previous precipitation of barium carbonate from barium sulphide and sodium carbonate, is added soda ash (anhydrous sodium carbonate) to give a solution containing 2½ lbs. of soda ash per gallon. The solution is filtered to remove the precipitate which consists mainly of iron sulphide and is added to the barium sulphide solution referred to above at a temperature a little below 70° C. until there is a slight excess of sodium carbonate present. Approximately 315 gallons of the sodium carbonate-sodium sulphide solution was required. The barium carbonate precipitate was filtered; part of the filtrate containing sodium sulphide may be used to dissolve a further quantity of soda ash to give a solution which after filtration can be added to a further quantity of barium sulphide. The precipitated barium carbonate was filtered, washed free from sodium sulphide and dried.

The advantage of the above method of dissolving the soda ash in a sodium sulphide solution from a previous precipitation is the avoidance of the use of water for dissolving the soda ash and a saving in the evaporation of the sodium sulphide solution which is usually concentrated before sale as crystals or as a substantially dehydrated material.

*Example III*

In 500 gallons of sodium sulphide solution containing 0.01 lb. of sodium sulphide per gallon and at 60° C. were dissolved 1500 lbs. of soda ash. The black precipitate was filtered and to the clear filtrate were added 795 gallons of barium sulphide containing 3 lbs. of barium sulphide per gallon and at 70° C. The precipitated barium carbonate was filtered, washed free from sodium sulphide, and dried.

A soda ash solution may be purified by the addition of a soluble sulphide which may be the sodium sulphide or barium sulphide which are materials used or obtained in the process of manufacture. For example,

*Example IV*

To 390 gallons of a solution of sodium carbonate of a specific gravity of 1.255 at 35° C. and containing 2.9 lbs. of sodium carbonate per gallon was added sodium sulphide to give 1 lb. sodium sulphide ($Na_2S$) per 100 gallons of the liquor. The temperature of the liquor was raised to 60° C. and filtered through a filter-press to remove the black precipitate which was mainly iron sulphide. The solution was added to 390 gallons of a barium sulphide solution at 59° C. and containing 2.0 lbs. of barium sulphide per gallon. The precipitated barium carbonate was filtered, washed free from sodium sulphide, and dried.

*Example V*

Example 4 was repeated but the barium sulphide solution and the sodium carbonate-sodium sulphide solution were added simultaneously, but maintaining a slight excess of barium sulphide, to the barium carbonate-sodium sulphide in the precipitating vessel. When the whole of the barium sulphide and sodium carbonate-sodium sulphide liquor had been added to the precipitation vat, a further small quantity of the sodium carbonate-sodium sulphide solution was added so that the batch has a slight excess of sodium carbonate present. The barium carbonate was filtered, washed free from sodium sulphide and dried.

Sodium bicarbonate may be treated with a sulphide and equally mixtures of sodium bicarbonate and sodium carbonate may be so treated. Where barium carbonate and sodium sulphydrate are manufactured by the precipitation of the former by mixing sodium bicarbonate solution and a barium sulphide solution, the sodium bicarbonate solution may previously be purified by adding to it a soluble sulphydrate or a soluble sulphide.

Where barium carbonate and sodium sulphydrate are manufactured by the precipitation of the former by means of a solution made by dissolving sodium carbonate in a sodium sulphydrate solution the sodium carbonate solution is thus purified.

*Example VI*

To a solution of sodium sulphydrate of 1.040 specific gravity at 50° C. was added soda ash to give a solution containing 2½ lbs. of sodium carbonate per gallon. The black precipitate was filtered. To 500 gallons of a barium sulphydrate solution of 1.090 specific gravity at 70° C. was added sufficient of the sodium carbonate-sodium sulphydrate solution to give a slight excess of sodium carbonate, the temperature being a little below 70° C. The barium carbonate was filtered from the sodium sulphydrate solution, washed substantially free from sodium sulphydrate, and dried.

Where barium carbonate and a mixture of sodium sulphydrate and sodium sulphide is desired, the barium carbonate is precipitated by adding a solution of the sodium carbonate dissolved in sodium sulphydrate, to a barium sulphide solution.

*Example VII*

To a solution of sodium sulphydrate of 1.040 specific gravity at 50° C. was added soda ash to give a concentration of 2½ lbs. of $Na_2CO_3$ per gallon. The black precipitate was filtered and the clear filtrate was added to a barium sulphide solution of 1.250 specific gravity at 70° C. and containing 3 lbs. of barium sulphide per gallon, the temperature at the time of addition being a little below 70° C. The addition was continued until there was a slight excess of sodium carbonate in solution. The barium carbonate was filtered from the solution containing the sodium sulphydrate and sodium sulphide, washed substantially free from sulphide and dried.

By a further feature of the invention the colour of the finished barium carbonate may be still further improved to a slight extent by adding a small proportion of calcium, barium, or strontium carbonate or calcium hydrate to the solution the barium sulphide which is used. A similar improvement may be obtained by adding to the barium sulphide solution a small quantity of a salt which will give a sulphide substantially insoluble in the barium sulphide solution which is used or a barium compound which is substantially insoluble in the barium sulphide solution. The settled or suspended solid matter is then removed and the liquor treated with a carbonate as described above.

*Example VIII*

To a barium sulphide solution of a specific gravity of 1.225 at 70° C. and containing approximately 2½ lbs. of barium sulphide per gallon (as referred to in Examples 1 and 2), was added, whilst stirring, precipitated calcium carbonate in the proportion of 3 lbs. per 100 gallons. The whole was allowed to settle after which the clear liquor was siphoned off and to this liquor at a temperature a little below 70° C. was added a solution of sodium carbonate in sodium sulphide from which the black precipitate had been filtered. There is a further slight improvement in the colour of the barium carbonate over that obtained in Examples 1 and 2.

We have found that barium carbonate produced by the process of the invention when mixed with titanium dioxide or other pigments gives, as compared with barium carbonate precipitated from barium sulphide solution without application of the invention, a clearer and brighter product in oil so that the value of the pigment is enhanced. The barium carbonate being substantially free from iron and other metallic impurities is particularly suitable for use in the manufacture of glass, enamels, and luminous pigments. The barium carbonate precipitated according to the methods indicated above is separated from the sulphide or sulphydrate solution, or a mixture of these, is washed and dried.

Whilst we prefer to dry the barium carbonate at temperatures from 50 to 100° C., in order to preserve the colour of the barium carbonate, higher temperatures of drying may be used.

It is understood that this invention covers the use of the chemical equivalents of the products referred to, for example potassium carbonate may be substituted for sodium carbonate and instead of using alkali sulphide for purifying the alkali carbonate an appropriate quantity of hydrogen sulphide may be passed into a solution of alkali carbonate.

It is to be understood that in the appended claims the term "salt of carbonic acid" includes both carbonates and bicarbonates and that the term "salt of hydrosulphuric acid" (hydrosulphuric acid=hydrogen sulphide) includes both sulphides and sulphydrates.

We claim:

1. In the manufacture of barium carbonate comprising the production of an aqueous solution of an alkali salt of carbonic acid and interaction of the solution with an aqueous solution of a barium salt of hydrosulphuric acid, the step which consists in treating the aqueous solution of the alkali salt of carbonic acid with a water-soluble sulphide and removing insoluble matter from the solution before interaction with the barium salt of hydrosulphuric acid.

2. In the manufacture of barium carbonate comprising the production of an aqueous solution of soda ash and interaction of the solution with an aqueous solution of a barium salt of hydrosulphuric acid, the step which consists in treating the aqueous solution of soda ash with sodium sulphide and removing insoluble matter from the solution before interaction with the barium salt of hydrosulphuric acid.

3. In the manufacture of barium carbonate comprising the production of an aqueous solution of soda ash and interaction of the solution with an aqueous solution of barium sulphide, the step which consists in treating the aqueous solution of soda ash with sodium sulphide and removing insoluble matter from the solution before interaction with the barium sulphide.

4. In the manufacture of barium carbonate comprising the production of an aqueous solution of an alkali salt of carbonic acid and interaction of the solution with an aqueous solution of a barium salt of hydrosulphuric acid, the step which consists in producing the aqueous solution of the alkali salt of carbonic acid by dissolving this salt in an aqueous solution of an alkali sulphide and removing insoluble matter from the solution.

5. In the manufacture of barium carbonate comprising the production of an aqueous solution of soda ash and interaction of the solution with an aqueous solution of a barium salt of hydrosulphuric acid, the step which consists in producing the aqueous solution of soda ash by dissolving this salt in an aqueous solution of an alkali sulphide and removing insoluble matter from the solution.

6. In the manufacture of barium carbonate comprising the production of an aqueous solution of soda ash and interaction of the solution with an aqueous solution of barium sulphide, the step which consists in producing the aqueous solution of soda ash by dissolving this salt in an aqueous solution of an alkali sulphide and removing insoluble matter from the solution.

7. In the manufacture of barium carbonate comprising the production of aqueous solutions of an alkali salt of carbonic acid and of a barium salt of hydrosulphuric acid and interaction of the solutions produced, the steps which consist in treating the aqueous solution of the alkali salt of carbonic acid with a water-soluble sulphide, treating the solution of the barium salt of hydrosulphuric acid with a small proportion of a material selected from the group consisting of alkaline earth carbonates and calcium hydrate and removing insoluble matter from each solution before interaction of the solutions.

8. In the manufacture of barium carbonate comprising the production of aqueous solutions of soda ash and of barium sulphide and interaction of the solutions produced, the steps which consist in treating the aqueous solutions of soda ash with sodium sulphide, treating the solution of barium sulphide with a small proportion of a material selected from the group consisting of alkaline earth carbonates and calcium hydrate and removing insoluble matter from each solution before interaction of the solutions.

9. In the manufacture of barium carbonate comprising the production of aqueous solutions of an alkali salt of carbonic acid and of a barium salt of hydrosulphuric acid and interaction of the solutions produced, the steps which consist in treating the aqueous solution of the alkali salt of carbonic acid with a water-soluble sulphide, treating the solution of the barium salt of hydrosulphuric acid with a small proportion of a salt which forms a barium compound substantially insoluble in the solution and removing insoluble matter from each solution before interaction of the solutions.

10. In the manufacture of barium carbonate comprising the production of aqueous solutions of soda ash and of barium sulphide and interaction of the solutions produced, the steps which consist in treating the aqueous solution of soda ash with sodium sulphide, treating the solution of barium sulphide with a small proportion of a salt which forms a barium compound substantially insoluble in the solution and removing insoluble matter from each solution before interaction of the solutions.

11. In the manufacture of barium carbonate by the interaction in aqueous solution of an alkali salt of carbonic acid with a barium salt of hydrosulphuric acid to produce barium carbonate and an aqueous solution of an alkali salt of hydrosulphuric acid, the step which consists in using at least a part of the solution of the alkali salt of hydrosulphuric acid obtained for dissolving a further quantity of the alkali salt of carbonic acid for use in the manufacture and separating insoluble matter from the solution.

12. In the manufacture of barium carbonate by the interaction in aqueous solution of soda ash with barium sulphide to produce barium carbonate and an aqueous solution of sodium sulphide, the step which consists in using at least a part of the solution of sodium sulphide obtained for dissolving a further quantity of soda ash for use in the manufacture and separating insoluble matter from the solution.

ISAAC EPHRAIM WEBER.
WILLIAM STANLEY WOOD.